US012688544B2

(12) United States Patent
Kim et al.

(10) Patent No.: US 12,688,544 B2
(45) Date of Patent: Jul. 21, 2026

(54) MULTI-NODE CLUSTER-BASED INFERENCE METHOD AND SYSTEM THROUGH GPU SEPARATE ALLOCATION OF PRE-TRAINED LAYER AND FINE-TUNING LAYER OF MULTIPLE DEEP LEARNING MODELS

(71) Applicant: LABLUP INC., Seoul (KR)

(72) Inventors: Joon Gi Kim, Seoul (KR); Jeong Kyu Shin, Seoul (KR)

(73) Assignee: LABLUP INC., Seoul (KR)

( * ) Notice: Subject to any disclaimer, the term of this patent is extended or adjusted under 35 U.S.C. 154(b) by 0 days.

(21) Appl. No.: 19/178,208

(22) Filed: Apr. 14, 2025

(65) Prior Publication Data

US 2026/0154775 A1     Jun. 4, 2026

Related U.S. Application Data

(63) Continuation of application No. PCT/KR2025/099784, filed on Mar. 13, 2025.

(30) Foreign Application Priority Data

May 8, 2024     (KR) ........................ 10-2024-0060288

(51) Int. Cl.
G06T 17/20          (2006.01)
G06N 3/08          (2023.01)
(Continued)

(52) U.S. Cl.
CPC ................. G06T 1/20 (2013.01); G06N 3/08 (2013.01)

(58) Field of Classification Search
CPC ................................. G06T 15/80; G06T 15/06
See application file for complete search history.

(56) References Cited

U.S. PATENT DOCUMENTS 9,971,785 B1 *  5/2018  Byrne ................... G06F 16/178
2016/0378563 A1 * 12/2016  Gaurav ............... G06F 9/45558
                                                             718/1

(Continued)

FOREIGN PATENT DOCUMENTS

KR     10-2022-0064806 A     5/2022
KR         10-2488537 B1     1/2023

OTHER PUBLICATIONS

Office Action of KIPO, issued on Jul. 1, 2024.
Notice of Allowance of KIPO, issued on Jan. 16, 2025.

*Primary Examiner* — Phuc N Doan
(74) *Attorney, Agent, or Firm* — ZION IP; Byungwoong Park

(57)     ABSTRACT

A multi-node cluster-based inference method through GPU separation allocation of a pre-trained layer and a fine-tuning layer of multiple deep learning models. The method includes: receiving an input value from a client; distributing the received input value, and transmitting the first input value to a first computation node including a container in which a neural network bundle of a first stage is loaded; performing, by a first container of the first computation nodes, an operation through a neural network layer of a GPU by using the received first input value as an input, and generating a first output value; and selecting a container in which the neural network bundle of the next stage is loaded, and transmitting the second output value to the computation node that includes the container in which the next stage is to be executed or the container in which to execute the next stage.

8 Claims, 8 Drawing Sheets

(51) Int. Cl.

| | | |
|---|---|---|
| *G06T 1/20* | (2006.01) | |
| *G06T 13/40* | (2011.01) | |
| *G06T 19/20* | (2011.01) | |
| *G06V 40/10* | (2022.01) | |

(56) References Cited

U.S. PATENT DOCUMENTS

| | | | | |
|---|---|---|---|---|
| 2021/0026762 A1* | 1/2021 | Memon | ................. | G06F 9/4411 |
| 2021/0303327 A1* | 9/2021 | Vu | ............................ | G06T 1/20 |
| 2021/0373971 A1* | 12/2021 | Lu | ......................... | G06F 9/5077 |
| 2022/0150898 A1* | 5/2022 | Jin | ........................ | G06F 9/5044 |
| 2022/0206833 A1* | 6/2022 | Bhandari | .................. | G06T 1/20 |
| 2023/0121052 A1* | 4/2023 | Kim | ..................... | G06F 9/5022 |
| | | | | 706/41 |
| 2023/0144662 A1* | 5/2023 | Tasinga | ................... | G06N 3/09 |
| | | | | 718/105 |

* cited by examiner

FIG. 1

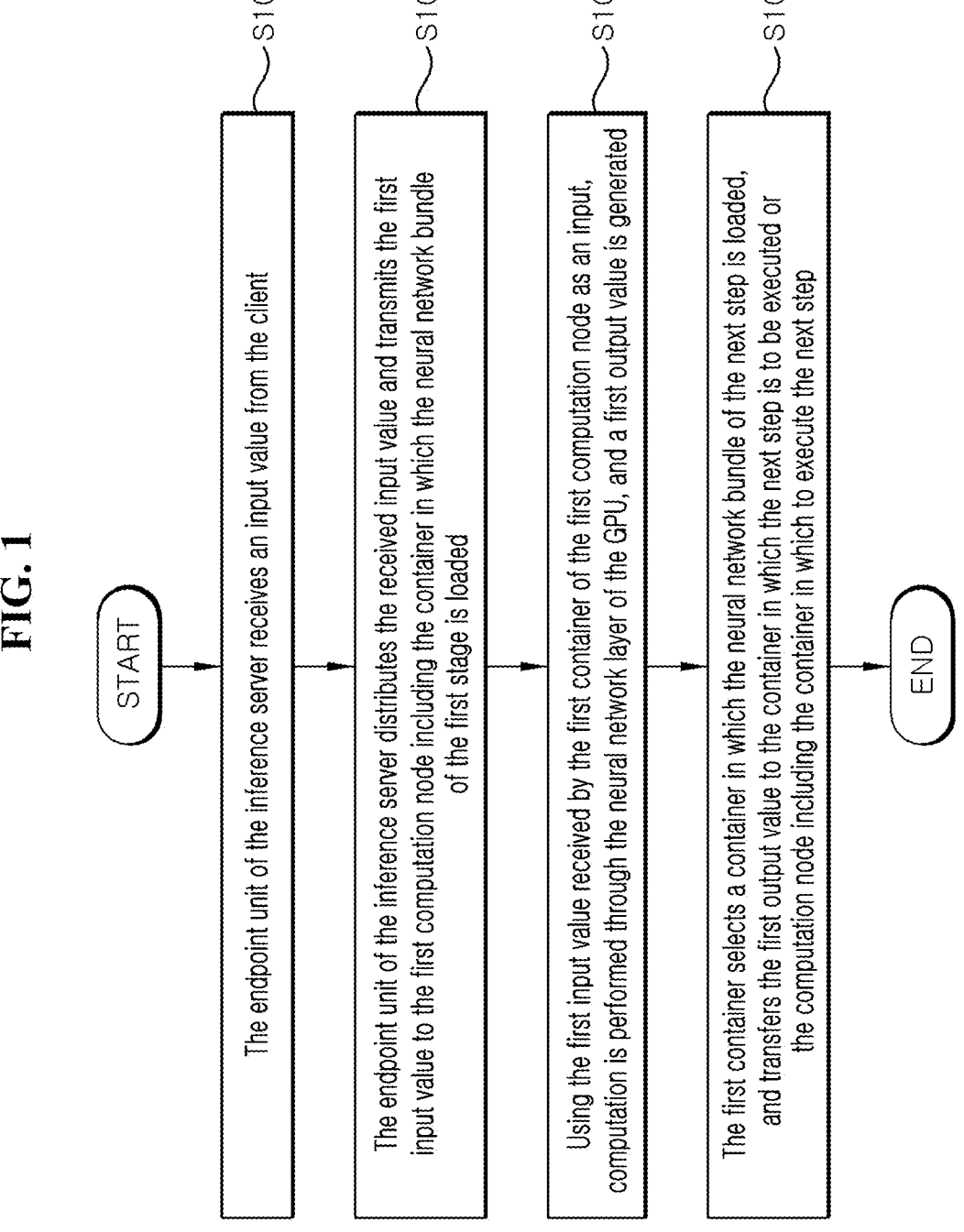

START

S101 — The endpoint unit of the inference server receives an input value from the client S103 — The endpoint unit of the inference server distributes the received input value and transmits the first input value to the first computation node including the container in which the neural network bundle of the first stage is loaded S105 — Using the first input value received by the first container of the first computation node as an input, computation is performed through the neural network layer of the GPU, and a first output value is generated S107 — The first container selects a container in which the neural network bundle of the next step is loaded, and transfers the first output value to the container in which the next step is to be executed or the computation node including the container in which to execute the next step

END

FIG. 2

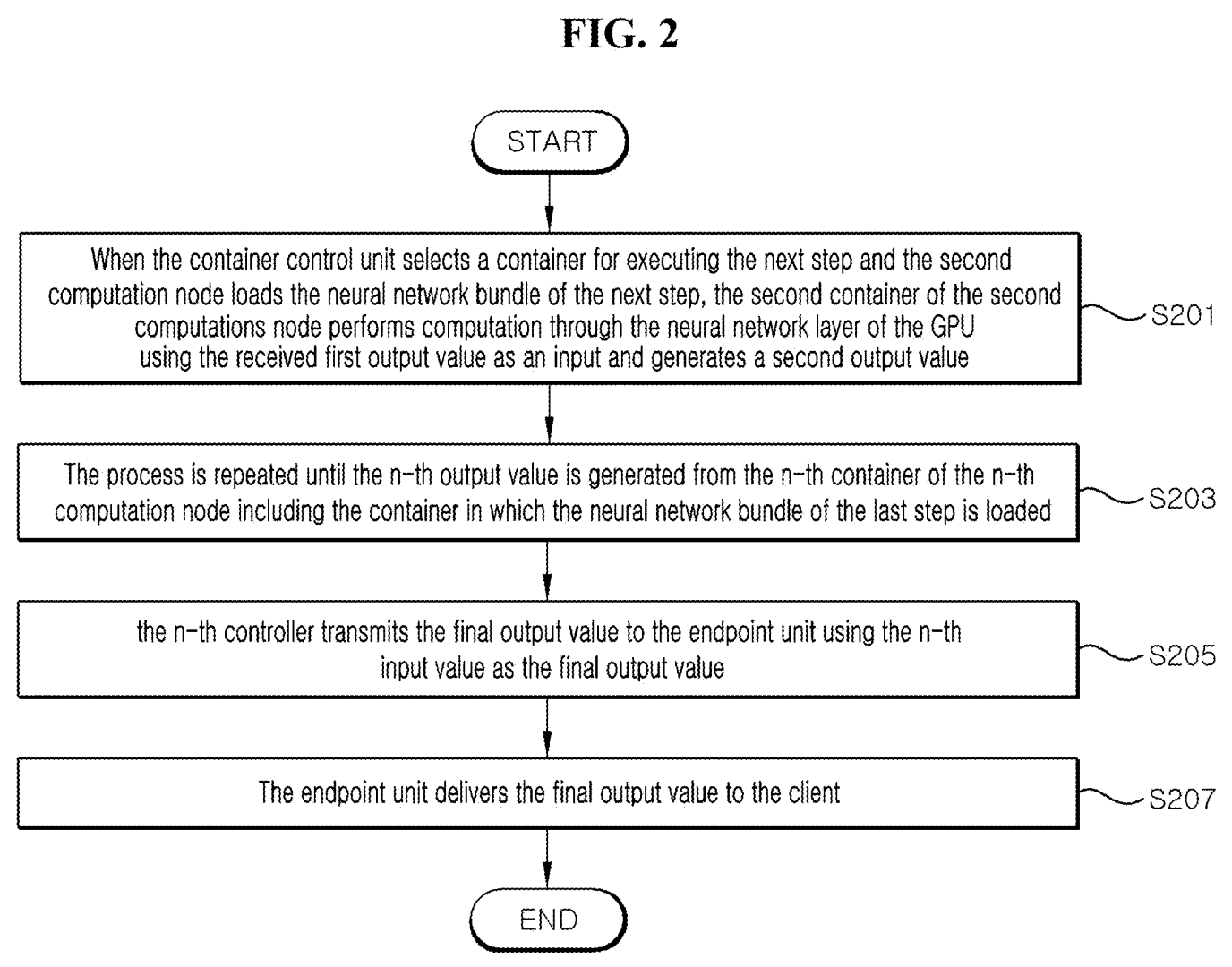

START

↓

When the container control unit selects a container for executing the next step and the second computation node loads the neural network bundle of the next step, the second container of the second computations node performs computation through the neural network layer of the GPU using the received first output value as an input and generates a second output value ⟋ S201

↓

The process is repeated until the n-th output value is generated from the n-th container of the n-th computation node including the container in which the neural network bundle of the last step is loaded ⟋ S203

↓ the n-th controller transmits the final output value to the endpoint unit using the n-th input value as the final output value ⟋ S205

↓

The endpoint unit delivers the final output value to the client ⟋ S207

↓

END

MULTI-NODE CLUSTER-BASED INFERENCE METHOD AND SYSTEM THROUGH GPU SEPARATE ALLOCATION OF PRE-TRAINED LAYER AND FINE-TUNING LAYER OF MULTIPLE DEEP LEARNING MODELS

TECHNICAL FIELD

The present invention relates to a multi-node cluster-based inference method and system through GPU separation allocation of a pre-trained layer and a fine-tuning layer of multiple deep learning models. In particular, the present invention relates to the multi-node cluster-based reasoning method and system through the GPU separation allocation of the pre-trained layers and the fine-tuning layers of the multiple deep learning models, in which the GPU can be stored separately from the pre-trained layer and the fine-tuning layer of the model to which fine-tuning is applied to the GPU through a split virtualization technique, and can be operated through multiple GPUs based on input values received from a client.

BACKGROUND

Transformer architecture-based large language models developed and published by many companies, including ChatGPT, which began to be introduced to the general public in late 2022, are commonly composed of multiple neural network layers composed of a very large number of parameters. Depending on the characteristics of the model itself, the quantization method used in the training and weight reduction process, the training dataset, and the like, in general, in the case of a model with 30 billion (300 billion) parameters or more capable of multilingual dialogue and a certain level or more of sporadic generation and logic development, 70 GB or more of GPU-dedicated memory is required when an inference service is provided by using the GPU. In addition, during the training process, it is necessary to store the intermediate value of the gradient calculation to be backpropagated in the model parameter set, which usually requires 2 to 2.5 times the memory capacity of the inference service. Based on the inference service, based on the A100 and H100 GPUs of NVIDIA used in building AI data centers as of the end of 2023 to the beginning of 2024, only one GPU or two or more GPUs are required, and if a model with more than 100 billion parameters such as ChatGPT is to be used, 2 to 4 GPUs or more are required. These language models are extended to support various media formats such as images and video as well as prompt input and output in the form of natural language text, and thus the size of the model and the GPU specification required for the operation process are increasing day by day. In this case, a graphics processing unit (GPU) is a graphics processing device, and means an electronic circuit that performs a mathematical operation at a high speed.

An original model obtained by injecting a large amount of natural language text into such a super-large language model from the beginning and performing primary learning is referred to as a "foundation model". This basic model is a state of learning about the grammar, vocabulary, and expression of the linguistic structure of the language of the text used as the input, and the facts and knowledge included in the input text. This can be further learned for a specific dataset, and can be used for an actual commercial service by providing more detailed background information on a specific field and a specific subject, or by giving a tendency of a virtual personality expressed by a prompt. This process is called fine-tuning. For the same underlying model, there may be a variety of fine tuning techniques and results depending on which neural network layers are replicated, modified, iterated, and randomized in what manner, how new neural network layers are further added, and how and with what additional datasets those neural network layers are trained.

In conventional large-scale cloud environments and data-center environments, when multiple customers each want to service multiple models that are fine-tuning based on the same underlying model, loading the models individually on the GPU will actually use memory by overloading pre-trained layers containing the same parameter values for each model and user. However, such redundant loading results in too much unnecessary space because the memory space occupancy ratio between the pre-trained layer and the fine-tuning layer differs by more than 10 times in large models, although it varies depending on the detailed fine-tuning technique.

The prior art patent is Published Patent Application No. 10-2022-0064806 (Method and Apparatus for Assigning a GPU to a Software Package), but only includes the steps of ascertaining package information of each of a plurality of software packages for a plurality of terminals connected with a network entity and GPU status information used by the plurality of the software packages, determining, based on the package information and the GPU status information, a change of a GPU usage profile when a workload of at least one of the plurality of the hardware packages is changed, determining a number of packages to process the workload, a GPU ID and a GPU usage location to be assigned to the packages based on the package Information and the GPU status Information, updating the GPU usage profile according to the determined GPU ID and GPU usage location, and assigning the GPU to the plurality of the computer software packages based on an updated GPU usage profile.

SUMMARY

Technical Problems

In order to solve the above-mentioned problems, an object of the present invention is to provide a multi-node cluster-based inference method and system through GPU separation allocation of pre-trained layers and fine-tuning layers of multiple deep learning models that can service various versions of fine-tuning language models with much less GPU resources by dividing the pre-trained layer and the fine-tuning layer of a language model to which fine-tuning is applied, sharing the pre-trained layer, and only mounting the fine-tuning layer on a GPU, and further enabling the fine-tuning layers of multiple models to share one GPU by utilizing a container-level GPU division virtualization technique.

Technical Solution

According to an embodiment of the present disclosure, a multi-node cluster-based inference method using GPU-separate allocation of a pre-trained layer and a fine-tuning layer of a multiple deep learning model includes: receiving, by an endpoint unit of an inference server, an input value from a client; distributing, by the endpoint unit of the inference server, the received input value, and delivering a first input value to a first computation node including a container in which a neural network bundle of a first stage is loaded;

performing, by a first container of the first computation nodes, an operation through the neural network layer of the GPU by using the received first input value as an input, and generating a first output value; and selecting, by the first container, a container in which the neural network bundle of the next stage is loaded, and delivering the first output value to the computation node that includes the container in which the next stage is to be executed or the container in which to execute the next stage, where the GPU includes at least one GPU, and refers to a physical GPU or a split virtualized GPU fragment, and at least one pre-trained layers and at least one fine-tuning layers of a model to which fine-tuning is applied through a split virtualization technique are separately stored in the GPU.

A multi-node cluster-based inference system through GPU separation allocation of a pre-trained layer and a fine-tuning layer of multiple deep learning models includes: an endpoint unit configured to receive an input value from a client, distribute the input value and transfer the distributed input value to a computation node including a container in which a neural network bundle of a first stage is loaded, and receive an output value from the container and transfer a final output value to the client; and a server control unit configured to receive the input value or the output value, perform computation through the neural network layer of the GPU to generate an output value, select a container in which the neural network bundle of the next stage is loaded, transfer the output value to the container in which the next stage is executed or another computation node that includes the container in which a next stage is executed, and transfer the final output value to an endpoint unit by using the output value as the final output value when the container in which it is loaded generates the output value, and transfer a list of containers capable of executing the next stage to the computation node, wherein the GPU includes at least one GPU, which means a physical GPU or a split virtualized GPU fragment, and at least one pre-trained layers and at least one fine-tuning layers of a model to which fine-tuning is applied through a split virtualization technique are separately stored in the GPU.

Effect of Invention

According to the present disclosure, the GPU may separately store a pre-trained layer and a fine-tuning layer of a model to which fine-tuning is applied to the GPU through a split virtualization technique.

In addition, based on the input value received from the client, it is possible to perform operations sequentially through multiple GPUs in which layers are separately stored.

In addition, for each GPU, the number of operations currently waiting and being processed and the expected required time may be tracked to select a container including neural network layers according to the order.

BRIEF DESCRIPTION OF THE DRAWINGS

FIGS. 1 and 2 are diagrams illustrating a multi-node cluster-based inference method through GPU separation allocation of a pre-trained layer and a fine-tuning layer of a multiple deep learning model according to an embodiment of the present invention.

FIGS. 5, 6, 7 and 8 are diagrams for describing GPU split allocation according to an embodiment of the present invention.

DETAILED DESCRIPTION

Figure 3:
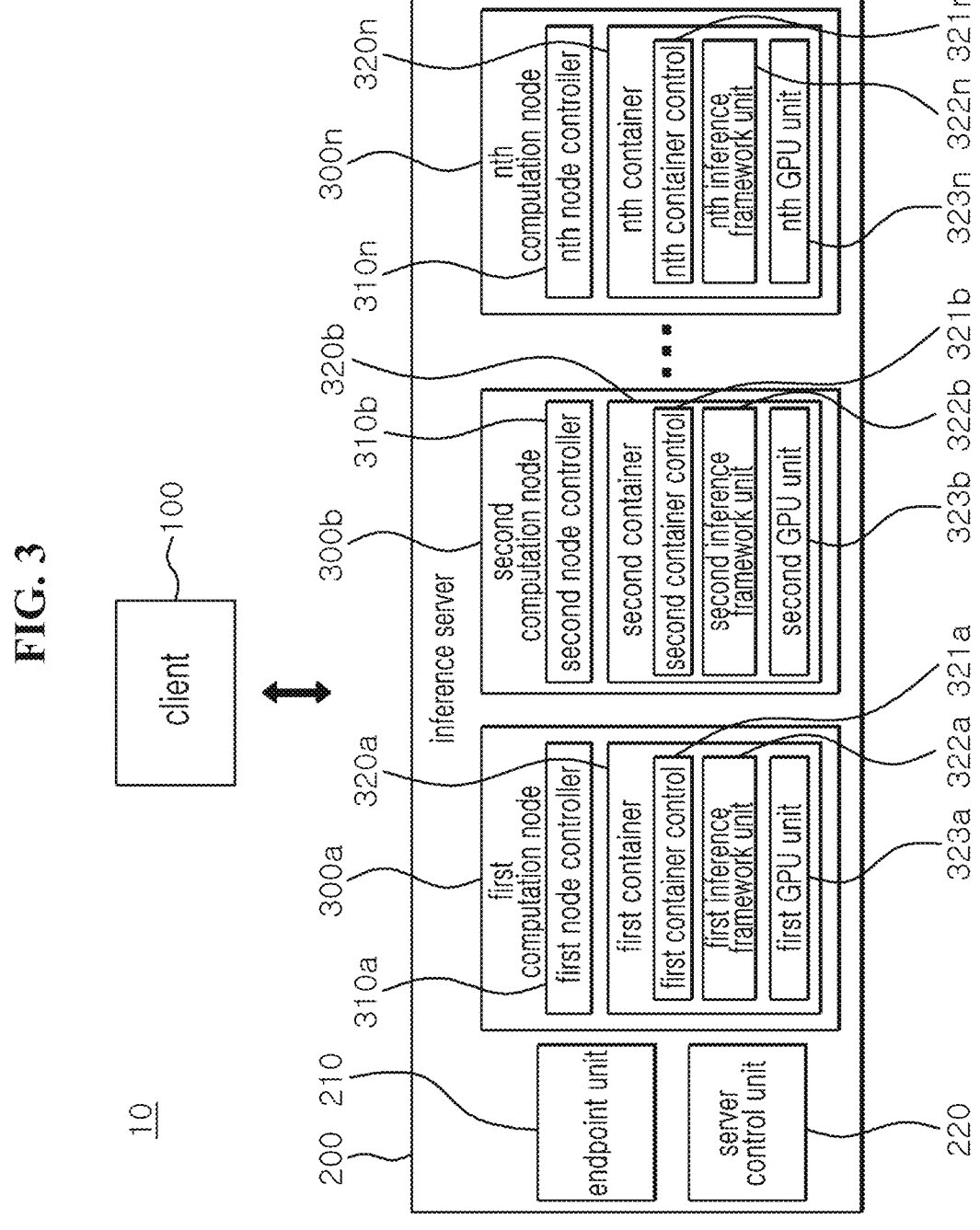
FIG. 3 is a schematic diagram of a multi-node cluster-based inference system through GPU separation allocation of a pre-trained layer and a fine-tuning layer of a multi-deep learning model according to an embodiment of the present disclosure.

A specific structural or functional description of the embodiments in accordance with the inventive concept disclosed herein is merely illustrative for the purpose of describing the embodiments in accordance the inventive concepts, and the embodiments in accordance to the inventive idea can be implemented in various forms and are not limited to the embodiments described herein.

Embodiments in accordance with the inventive concept are capable of various modifications and of various forms, and thus are illustrated in the drawings and are herein described in detail. It should be understood, however, that there is no intent to limit embodiments in accordance with the inventive concept to the particular forms disclosed, but on the contrary, the intention is to cover all modifications, equivalents, or alternatives falling within the spirit and scope of the invention.

The terminology used herein is for the purpose of describing particular embodiments only and is not intended to be limiting of the invention. The singular forms "a," "an," and "the" include plural referents unless the context clearly dictates otherwise. It should be understood that terms such as "comprises" and "comprising" are used herein to specify the presence of stated features, numbers, steps, operations, components, parts, or combinations thereof, but do not preclude the presence or addition of one or more other features, numbers, step, operations, components or combinations thereof.

Although the deep learning model described herein refers to a language model as a main example, the subject matter that may be addressed by the techniques and systems of the present invention may be applied to all types of deep learning models that are composed of multiple neural network layers and that can distinguish each neural network layer for pre-trained and fine-tuning purposes, and may not be limited to language models. Hereinafter, embodiments of the present invention will be described in detail with reference to the accompanying drawings.

FIGS. 1 and 2 are diagrams illustrating a multi-node cluster-based inference method through GPU separation allocation of a pre-trained layer and a fine-tuning layer of a multiple deep learning model according to an embodiment of the present invention.

Referring to FIGS. 1 and 2, the endpoint unit 210 of the inference server 200 receives an input value from the client 100 (S101), and distributes the received input value and transmits the first input value to the first computation node 300a including the container in which the neural network bundle of the first stage is loaded (S103). The input value may be attached with the client's original unique request ID and the fine-tuning model ID, and may be used to query the container list of the next step. The endpoint unit 210 may distribute the input values received from the client 100 using a round-robin or a separate load distribution algorithm that utilizes performance metrics that are periodically updated or provided in real-time by the container control 321 of each compute node 300.

Using the first input value received by the first container 320a of the first computation node 300a as an input, computation is performed through the neural network layer of the GPU, and a first output value is generated (S105). When a received first input value needs to be converted, the first container 320a may convert the received first input value to be operable in a neural network layer stored in the GPU unit 323. In addition, the first container 320a may perform calculation (operation) through a neural network layer by utilizing a GPU acceleration operation function through at least one GPU included in the GPU unit 323 on a set of received input values or transformed input values, and may generate an output value. In this case, the generated output value may be expressed as an operation result in the form of a vector, a matrix, and other numerical information. The generated output value may be converted if conversion is required, and when the output value is generated, the first container 320a selects a container in which the neural network bundle of the next step is loaded, and transfers the first output value to the container in which the next step is to be executed or the computation node including the container in which to execute the next step (S107).

The container control unit 321 of the container 320 may track the number of operations currently waiting and being processed and the required time for each GPU of the GPU unit 323 in the same container 320 through the performance metric and the performance measurement mechanism, and store the number of operations and the expected required time as the scheduling hint. In addition, the container control unit 321 may receive, from the server control unit 220, a list of containers capable of executing the next step. The container control unit 321 may query a scheduling hint through an API/RPC request based on a list of containers capable of executing a next step received from the server control unit 220, or may retrieve and query a scheduling hint stored in a separate database or cache server. The container control unit 321 may select a container to execute the next step according to the routing policy based on the container list and the scheduling hint as described above. The routing policy may apply various scheduling methods through at least one of a round-robin method and a method of selecting a GPU with a minimum number of to-be-computed operations.

When the container control unit 321 selects a container for executing the next step and the second computation node 300b loads the neural network bundle of the next step, the second container 320b of the second computations node 300b performs computation through the neural network layer of the GPU using the received first output value as an input and generates a second output value (S201). The process is repeated until the n-th output value is generated from the n-th container 320n of the n-th computation node 300n including the container in which the neural network bundle of the last step is loaded (S203), and the n-th controller 320n transmits the final output value to the endpoint unit 210 using the n-th input value as the final output value (S205). The endpoint unit 210 delivers the final output value to the client 100 (S207).

FIG. 3 is a schematic diagram of a multi-node cluster-based inference system through GPU separation allocation of a pre-trained layer and a fine-tuning layer of a multi-deep learning model according to an embodiment of the present disclosure.

Referring to FIG. 3, a multi-node cluster-based inference system 10 with GPU-separated allocation of pre-trained layers and fine-tuning layers of multiple deep learning models is composed of a client 100 and an inference server 200.

The inference server 200 includes an endpoint unit 210, a server control unit 220, and at least one computation node 300.

The endpoint unit 210 may include a pre-generated inference endpoint having at least one fixed address, and may receive an input value from the client 100 through the inference endpoint. In addition, the endpoint unit 210 may distribute the received input values and transmit the input values to the computation node 300 including the container in which the neural network bundle of the first stage is loaded. The input value may be attached with the client's original unique request ID and the fine-tuning model ID, and may be used to query the container list of the next step. In an embodiment, when the container in which the neural network bundle of the first stage corresponding to the first input value distributed by the endpoint unit 210 is loaded is the first computation node 300a, the endpoint unit 220 may transmit the first input value to the first computations node 300a. The endpoint unit 210 may distribute the input values received from the client 100 using a round-robin or a separate load distribution algorithm that utilizes performance metrics that are periodically updated or provided in real-time by the container control 321 of each compute node 300.

Upon receiving the final output value from the container 320, the endpoint unit 210 may transmit the final output value to the client 100 through the corresponding client connection channel. When the endpoint unit 210 delivers the final output value to the client 100, the endpoint unit may route the final output value of the container to the container controller 321 of the container loaded with the neural network bundle of the first stage to process the traffic in the response direction. In addition, when the endpoint unit 210 transmits the final output value to the client 100, the final output value may be issued to a separate message queue so that the container controller 321 of the container in which the neural network bundle of the first stage is loaded responds.

The server control unit 220 may control the entire configuration of the inference server 200, and may transfer a container list capable of executing the next step to the container 320 of the computation node 300.

The calculation node 300 includes a node controller 310 and a container 320, and the inference server 200 may include at least one or more calculation nodes 300.

The node control unit 310 may generate at least one or more of the plurality of containers 320 in the operation node 300, may stop or delete the execution of the container 320 being executed by receiving an instruction from the server control unit 220, and may perform performance and state monitoring.

The container 320 includes a container control unit 321, an inference framework unit 322, and a GPU unit 323, and one computation node 300 may include at least one or more containers 320.

The container control unit 321 may receive an input value from the endpoint unit 210 and transfer the input value to the inference framework unit 322. In addition, the container control unit 321 may receive an output value from another computation node 300 or another container 320 and transmit the output value as an input value to the inference framework unit 322. Upon receiving the output value from the inference framework unit 322, the container control unit 321 may select the container 320 to execute the next step, and transfer the output value to the container control unit 320 of the container 320 to perform the next step or the computation node 300 including the container 320 to carry out the next step. When delivering the output values, the container control 321 may route all neural network layer bundles sequentially to operate on the requests of the multiple clients using the respectively requested fine-tuning model instances so that the requests of the individual fine-tuning model instants and the multiple clients are not mixed.

The container control unit 321 may track the number of operations currently waiting and being processed and the required time for each GPU of the GPU unit 323 in the same container 320 through the performance metric and the performance measurement mechanism of the inference framework unit 322, and store the number of operations and the expected required time as scheduling hints. The container control 321 may continuously update the scheduling hint. In addition, the container control unit 321 may receive, from the server control unit 220, a list of containers capable of executing the next step. At this time, the container control unit 321 may call a dedicated API capable of connecting to the internal network of the inference server 200. When the container control unit 321 receives an input value from the endpoint unit 210, the container list may be continuously delivered together until the container list information for each stage is received together and the entire operation for the corresponding client request is completed. In addition, the container list data may be read by the container controller 321 to a separate database or cache server using each model instance and each neural network layer bundle as keys.

The container control unit 321 may query a scheduling hint through an API/RPC request based on a list of containers capable of executing a next step received from the server control unit 220, or may retrieve and query a scheduling hint stored in a separate database or cache server. The container control unit 321 may select a container to execute the next step according to the routing policy based on the container list and the scheduling hint as described above. The routing policy may apply various scheduling methods through at least one of a round-robin method and a method of selecting a GPU with a minimum number of to-be-computed operations.

When it is determined that there is no container 320 for executing the next step, the container control unit 321 may transmit the final output value to the endpoint unit 210 by using the last output value received from the inference framework unit 322 as the final output value.

Figure 4:
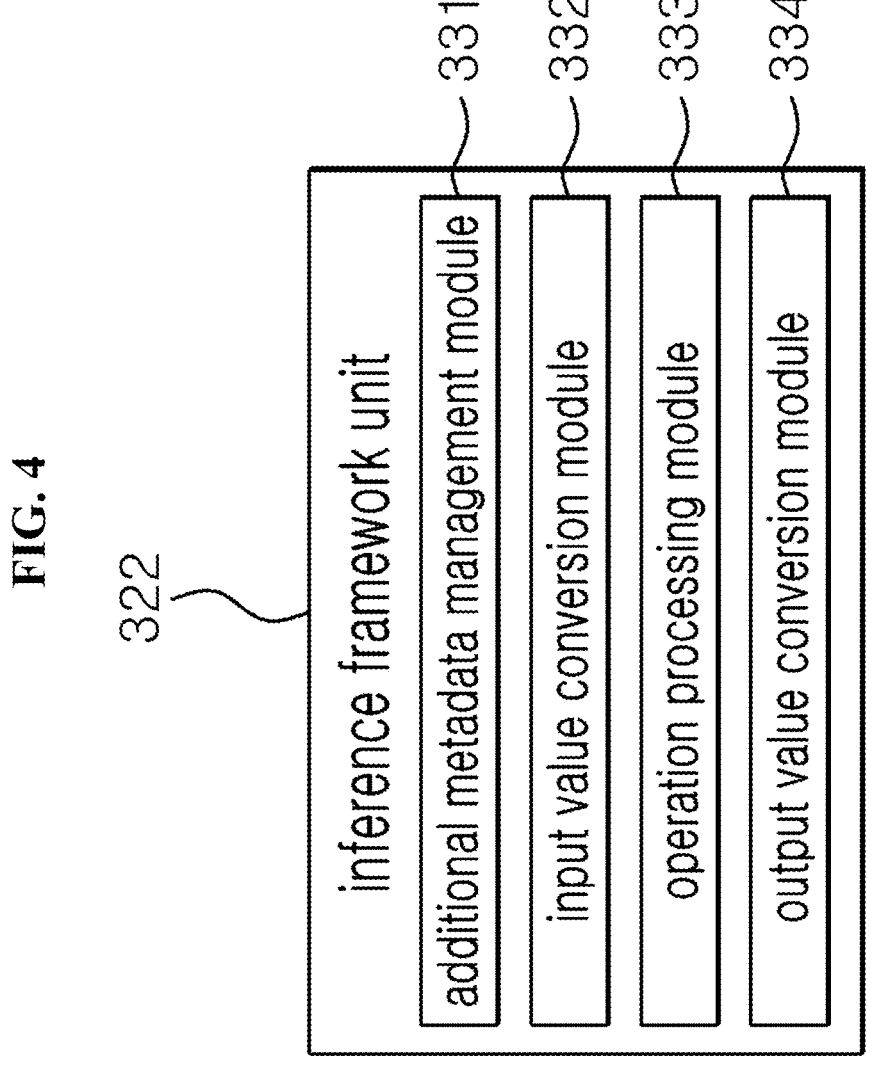
FIG. 4 is a schematic diagram of an inference framework according to an embodiment of the disclosure.

The inference framework unit 322 includes an additional metadata management module 331, an input value conversion module 332, an operation processing module 333, and an output value conversion module 334. FIG. 4 is a schematic diagram of an inference framework unit according to an embodiment of the disclosure.

The additional metadata management module 331 may recognize the additional metadata, select the pre-trained layer and the fine-tuning layer from a single model based on at least one of a patch, an API, and an interface through fork, and divide and load (store) the pre-trained layer and the fine-tuning layer on at least one GPU included in the GPU unit 323. The additional metadata management module 331 may load the model parameter set into the GPU memory, and one model may be generally stored in the form of a snapshot of the parameter set divided into constant capacities with the GPU capacity configuration in mind in units of neural network layers. In this case, the model includes neural network layers, and is applicable to all types of deep learning models that can divide each neural network layer into pre-trained and fine-tuning. The pre-trained layer and the fine-tuning layer may include additional metadata, and the additional metadata management module 331 may recognize the additional metadata included in each layer, divide the additional metadata into each GPU, and store one or more models separately. The additional metadata refers to data in the form of a constant list or a binary flag that can determine whether each neural network layer is a pre-trained layer or a fine-tuning layer.

Figure 5:
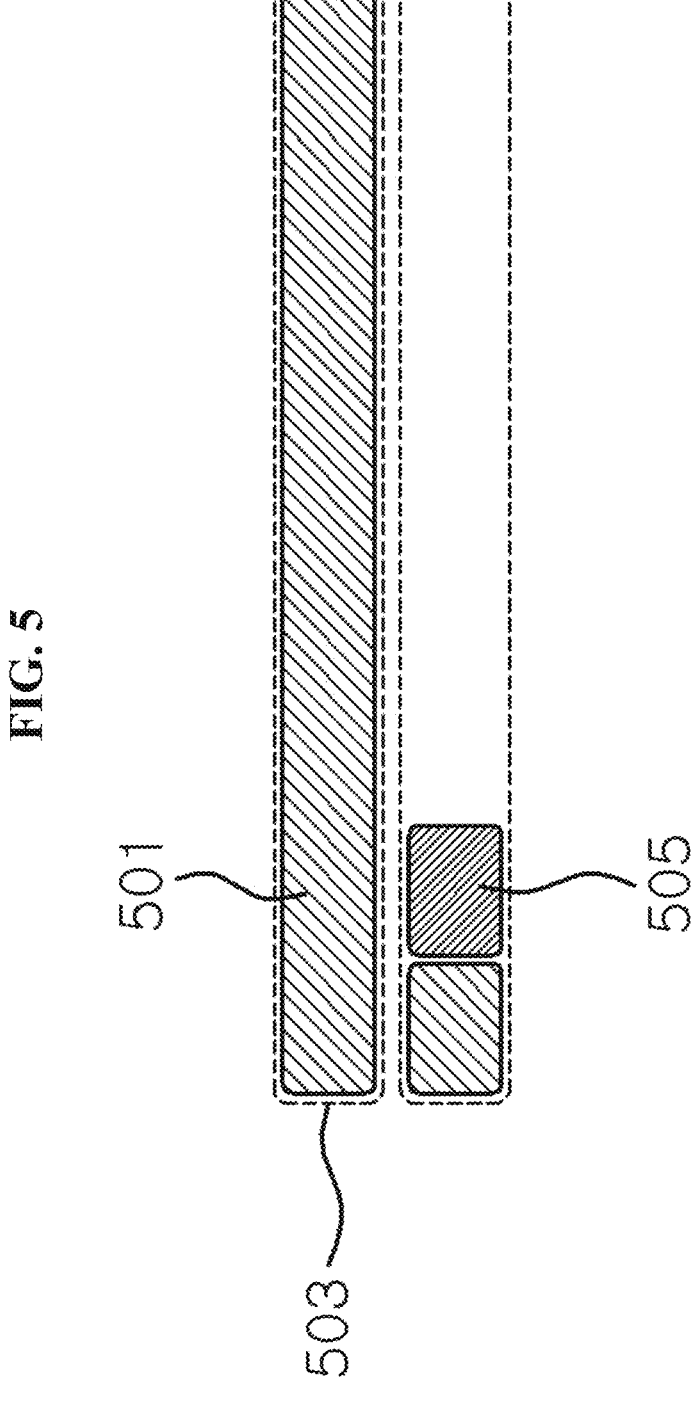

FIGS. 5 to 8 are diagrams for describing GPU split allocation according to an embodiment of the present invention. Referring to FIG. 5, a region occupied by the pre-trained layer 501 and the fine-tuning layer 505 in the memory space 503 for each GPU device is illustrated. In FIG. 5, as an embodiment, two GPUs having a capacity of 80 GB are utilized to load a model having a capacity of 100 GB in which the pre-trained layer 501 is 90 GB and the fine-tuning layer 505 is 10 GB.

In general, since the layers of the model are not separately loaded but simply loaded, if the number of the models is N and the memory required capacity of the pre-trained layer and the fine-tuning layer combined in one model is M, the memory of the entire NM capacity is required by simple loading. In one embodiment, the memory required capacity of a model is 100 GB (M), and a simple loading of 50 (N) individual models requires a total of 5,000 GB (M*N) of GPU memory.

However, removing redundant portions in a manner that separates and loads (stores) the layers of the model and only individually loads the fine-tuning layers while sharing the pre-trained layers significantly reduces the required GPU memory. Assuming that the number of models is N, the proportion of space occupied by the pre-trained layer is p ($0 \leq p \leq 1$), and the memory required capacity of a pre-trained layer and a fine-tuning layer is M, a memory having a capacity of $Mp+NM(1-p)=M\{(1-N)p+N\}$ is required when the pre-trained layers are shared and loaded. In an embodiment, the memory required capacity of the model is 100 GB (M), the size of the pre-trained layer is 90 GB (p=0.9), and only 590 GB is required if 50 (N) individual models are loaded while sharing the pre-trained layers.

It can be seen from the above example that 5,000 GB of GPU memory is required for simple stacking and 590 GB of memory is required for separate stacking. If the A100 GPU with 80 GB capacity is considered as a reference, it is much more economical to load separately because 63 sheets are needed to hold 5,000 GB of capacity and 8 sheets are required to hold 590 GB of capacity.

Figure 6:
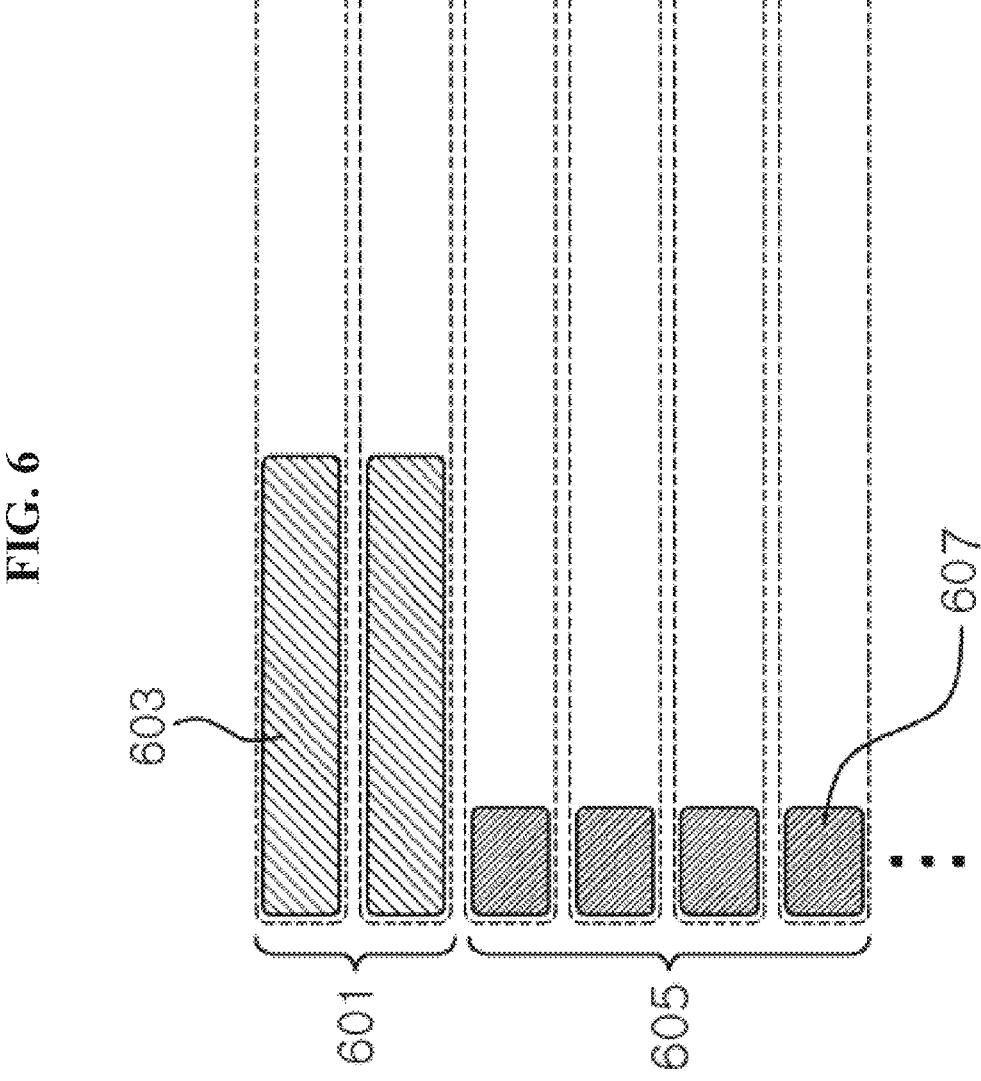

When pre-trained layers and fine-tuning layers are loaded separately, the pre-trained layers may only load a set of copies into the GPU memory and only multiple fine-tuning layers into separate GPU memories. Referring to FIG. 6, two GPU memories 601 loaded with a pre-trained layer 603 are shared, and a GPU 605 allocated to each user and each resultant model is loaded with a fine-tuning layer 607. The pre-trained layers are shared GPUs, and only the fine-tuning layers are separately loaded into individual GPU memories.

Figure 7:
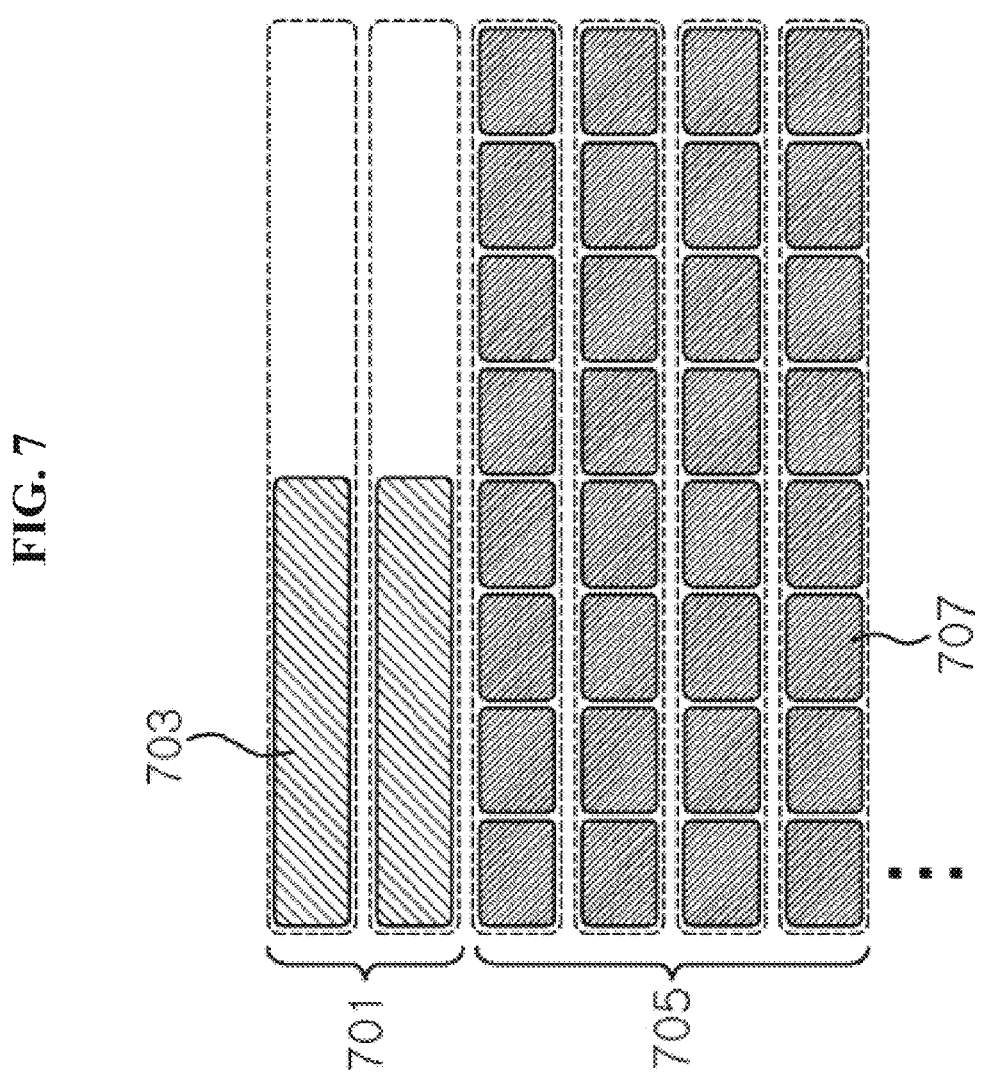

However, since there may still be wasted memory in the GPU where the fine-tuning layers are stored, container-level GPU virtualization techniques may be further applied to improve simultaneous servicing of at least one or more fine-tuning layers in a single GPU. Referring to FIG. 7, a case in which two GPU memories 701 loaded with a pre-trained layer 703 are shared, and container-level GPU split virtualization is applied to load a plurality of fine-tuning layers 707 on one GPU and load the fine-tuning layer 707 on a GPU memory 705 to which split virtualization has been applied is shown. In addition, referring to FIG. 8, in order to further increase the efficiency of separate loading, the pre-trained layer 803 may be separately loaded into the two GPU memories 801, the pre-trained layer 803 is loaded, and the fine-tuning layer 807 may be further loaded into the remaining space of the GPU memory 801. Container-level GPU segmentation virtualization may be applied to load multiple fine-tuning layers 807 into one GPU and load them into the memory of the GPU 805 to which the segmentation virtualization is applied.

Figure 8:
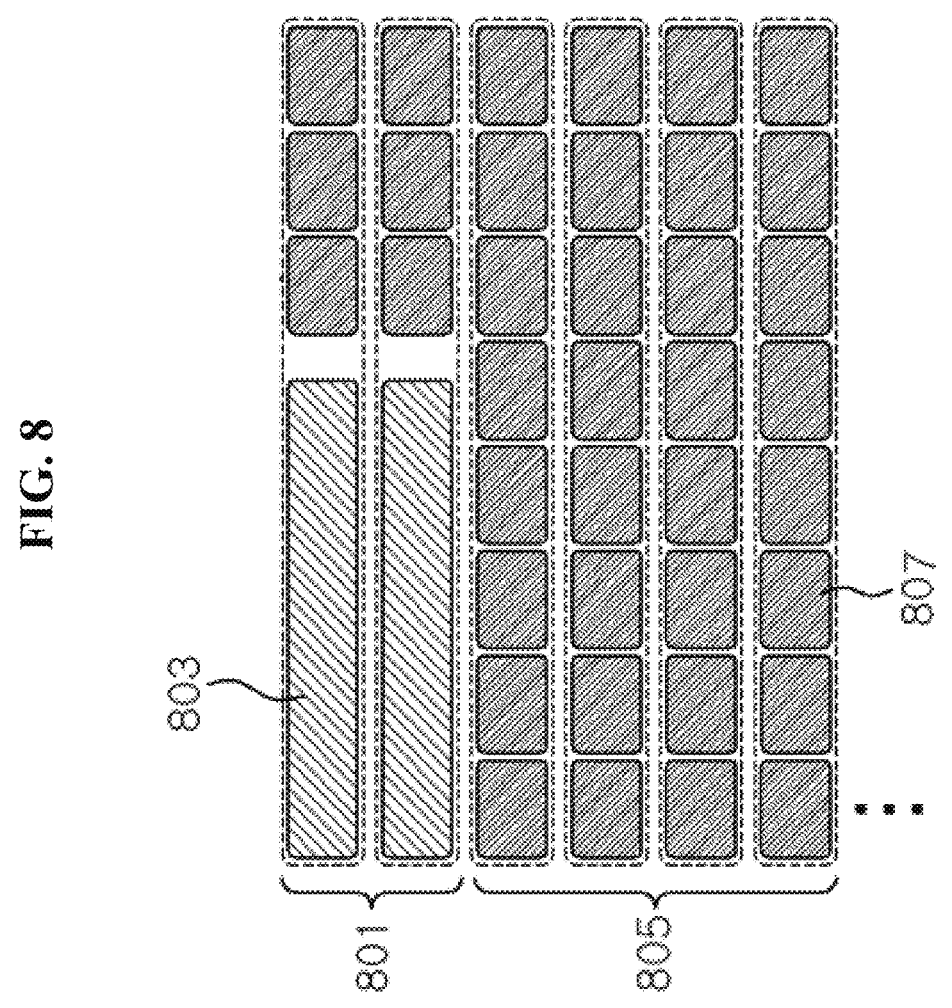

As shown in FIG. 8, it is possible to store the pre-trained layer and the fine-tuning layer separately by minimizing the empty space, but in reality, if there is only one pre-trained-layer GPU set for a very large number of individual model instances, user requests for all individual models may be concentrated to one, which may cause bandwidth and latency problems. Therefore, in actual implementation, factors such as the actual model, the performance of the GPU, and the network performance of the inference server 200 need to be considered to measure the bandwidth (the number of requests processed per second, the token generation speed of the prompt response) and the delay time (the time taken for each request), and find a point where the performance is attenuated according to the number of copies of the GPU set for the pre-trained layer, thereby compromising the cost (the number of GPUs) and the performance at an appropriate level, and applying the load distribution mechanism.

When it is necessary to convert the input value received from the container control unit 321, the input value conversion module 332 may convert the input value so that the input value may be calculated by a neural network layer stored in the GPU unit 323. The input value conversion module 332 may convert a prompt character string given as an input value into a set of embedding vectors through a tokenizer module. In addition, the input value conversion module 332 may include a serialization and deserialization module for transmitting the input value received from the container control unit 321 via a network. The input value conversion module 332 may optionally convert the input value by applying various compression and serialization techniques, such as a non-compression, Huffman coding-based compression algorithm, a vector and matrix compression algorithm considering sparsity, according to model characteristics, hardware specifications of each operation node, and manager settings. In addition, the input value conversion module 332 may apply additional symmetric and asymmetric encryption according to a network configuration or a security requirement level, but is not necessarily limited thereto.

The operation processing module 333 may perform calculation (operation) through a neural network layer by utilizing a GPU acceleration operation function through at least one GPU included in the GPU unit 323 on a set of embedding vectors that are input values received from the container control unit 321 or input values converted by the input value conversion module 332, and generate output values. In this case, the generated output value may be expressed as an operation result in the form of a vector, a matrix, and other numerical information. The operation processing module 333 may convert the generated output value through the output value conversion module 334, and may transmit the generated output value or the output value converted through the output value transformation module 334 to the container control unit 321. When transmitting the generated output value or the output value converted through the output value conversion module 334 to the container control unit 321, the arithmetic processing module 333 may perform high-speed transmission through a general network such as an Ethernet and a TCP socket, as well as a high-speed transmission technology such as InfiniBand-based GPUDirect Access (RDMA) and Ethernet-based RDMA (RoCE). In addition, the operation processing module 333 may transfer an output value in a zero-copy manner through a shared memory with the container control unit 321.

The output value conversion module 334 may convert the output value when conversion of the output value generated by the operation processing module 333 is necessary. In addition, the output value conversion module 334 may include a serialization and deserialization module for transmitting the output value generated by the operation processing module 333 through a network. The output value transformation module 334 may optionally transform the output values by applying various compression and serialization techniques, such as non-compression, Huffman coding based compression algorithms, vector and matrix compression algorithms with sparsity considerations, according to model characteristics and hardware specifications and manager settings of each compute node. In addition, the output value conversion module 334 may apply additional symmetric and asymmetric encryption according to a network configuration or a security requirement level, but is not necessarily limited thereto.

The GPU unit 323 includes at least one GPU, and may include a plurality of physical GPUs or a plurality of split virtualized GPU pieces. The GPU (Graphic Processing Unit) refers to a graphics processing device, and at least one pre-trained layer and at least one fine-tuning layer of a model to which fine-tuning is applied through a split virtualization technique may be separately stored. In this case, the pre-trained layer may refer to a model that is first learned, and the fine-tuning layer may refer to the model that further learns about a specific dataset and has more detailed background knowledge about a specific field and a specific subject. Although the present invention is described based on a super-large language model to which fine-tuning is applied, the present invention can be applied to any model to which fine-tuning is applied. In addition, the present disclosure may deal with a case in which the pre-trained layer and the fine-tuning layer may be explicitly distinguished by selectively re-training only a part of the neural network layers of the pre-trained model or by generating additional layers or replicating and re-training the existing layers, rather than re-training all the neural network layers evenly.

The pre-trained layer and the fine-tuning layer stored in the GPU may include additional metadata. The additional metadata refers to data in the form of a constant list or a binary flag that can determine whether each neural network layer is a pre-trained layer or a fine-tuning layer. The additional metadata may be recorded in a separate file from the parameter set utilizing a markup language (JSON, YAML, etc.), an embedded key-value metadata field supported by the IR version 10 or higher of the ONNX standard, or similar user-defined fields in other model description formats to be recorded in the pre-trained and fine-tuning layers. In addition, the additional metadata may include at least one of format information of output values and input values including a size of a matrix or a vector and a representation format of individual elements, a version of each layer set, and a unique ID, so that the pre-trained layer and the fine-tuning layer may be updated and distributed independently.

While the invention has been described with reference to the embodiments shown in the drawings, this is for illustrative purposes only and it will be understood by those skilled in the art that various modifications and equivalent arrangements may be made therefrom. Therefore, the true technical protection scope of the present invention should be defined by the technical spirit of the appended claims.

What is claimed is:

1. A multi-node cluster-based inference method using GPU-separated allocation of a pre-trained layer and a fine-tuning layer of multiple deep learning models, comprising:

receiving, by an endpoint unit of an inference server, an input value from a client;

distributing the input value received by the endpoint unit of the inference server, and transmitting a first input value to a first computation node including a first container for loading a neural network bundle of a first step;

performing an operation through a neural network layer of a GPU by using the first input value received by the first container of the first computation node as an input, and generating a first output value;

selecting, by the first container, a next container in which a neural network bundle of a next step is loaded, and transferring the first output value to the next container in which the next step is executed or a next computation node including the next container in which the next step is executed;

if a second computation node loads the neural network bundle of the next step, performing computation through the neural network layer of the GPU by using the first output value received by a second container of the second computations node as an input, and generating a second output value;

repeating until an n th output value is generated from an n th container of an n th computation node including the n th container that carries the neural network bundle of the last step, wherein n is an integer greater than two;

taking, by the nth container, the nth output value as a final output value and delivering the final output value to the endpoint unit; and delivering, the endpoint unit, the final output value to the client, wherein the GPU is included in each computation node as a split virtualized GPU fragment, wherein at least one pre-trained layer and at least one fine-tuning layer of a model to which fine-tuning is applied through a split virtualization technique are separately stored in the GPU;

wherein the each computation node includes an inference framework part, and the inference framework part includes an additional metadata management module, wherein the additional metadata management module is configured to load a model parameter set into a memory of the GPU, the model parameter set is stored in a form of a snapshot of the model parameter set after being divided into a certain capacity based on a GPU capacity configuration in a unit of the neural network layer of the GPU, and a recognized additional metadata included in each layer of the model which is more than one model is divided and stored in each GPU, and wherein the GPU uses a shared GPU as pre-trained layers and separates only fine-tuning layers and loads each of the fine-tuning layers into individual GPU memories.

2. The method of claim 1, wherein in the step of selecting, by the first container, the next container in which the neural network bundle of the next step is loaded, and transferring the first output value to the next container in which the next step is to be executed or a next computation node including the next container in which to execute the next step, the first container tracks a number of operations currently waiting and being processed and an expected time required for each GPU of a first GPU unit in the first container through a performance metric and a performance measurement mechanism of an inference framework constituting the first container, stores the number of operations and the expected time as a scheduling hint, receives a list of containers capable of executing the next step from a server control unit of the inference server, and selects the next container for executing the next step based on the scheduling hint and the list of containers.

3. The method of claim 1, wherein the pre-trained layer and the fine-tuning layer include the additional metadata, and the additional metadata: is a data in a form of a constant list or a binary flag to determine whether each neural network layer is the pre-trained or fine-tuning layers, the data includes at least one of format information of an output value and an input value including a size of a matrix or a vector and a representation format of individual elements, a version of each layer set, and a unique ID, so that the pre-trained layer and the fine-tuning layer are independently updated and distributed.

4. The method of claim 1, wherein the first container includes a first inference framework part, and the first inference framework part recognizes the additional metadata, selects the pre-trained layer and the fine-tuning layer from a single model, and loads the selected pre-trained layers and fine-tuning layers into the GPU.

5. A multi-node cluster-based inference system using GPU separation allocation of a pre-trained layer and a fine-tuning layer of multiple deep learning models, comprising:

an endpoint unit that receives an input value from a client, distribute the input value, deliver the distributed input value to at least one computation node including at least one container in which a neural network bundle of a first stage is loaded, receive an output value from the at least one container, and deliver a final output value to the client;

at least one computation node that receives the input value or the output value, performs computation through a neural network layer of a GPU to generate an output value, selects a next container in which a neural network bundle of a next step is loaded, forwards the output value to the next container in which the next step is to be executed or a next computation node including the next container in which to execute the next step, and when the next container in which a network bundle of a last step is loaded generates the output value, takes the output value as a final output value, and forwards the final output value to the endpoint unit; and a server control unit that delivers a list of containers capable of executing next step to the at least one computation node, wherein the GPU is included in each computation node as a split virtualized GPU fragment, wherein at least one pre-trained layer and at least one fine-tuning layer of a model to which fine-tuning is applied through a split virtualization technique are separately stored in the GPU, wherein the at least one computation node includes an inference framework part, and the inference framework part includes an additional metadata management module, wherein the additional metadata management module is configured to load a model parameter set into a memory of the GPU, the model parameter is stored in a form of a snapshot of the model parameter set by dividing the model parameter set to a constant capacity based on a GPU capacity configuration in a unit of the neural network layer of the GPU, a recognized additional metadata included in each layer of the model which is more than one model is divided and stored in each GPU, and wherein the GPU uses a shared GPU for the pre-trained layers, and only the fine-tuning layers are separated and loaded into individual GPU memories respectively.

6. The system of claim 5,:

wherein the at least one container tracks a number of operations currently waiting and being processed and an expected time required for each GPU of GPU units in the at least one container through a performance metric and a performance measurement mechanism of an inference framework constituting the at least one container, stores the number of operations and the expected time as a scheduling hint, receives a list of containers capable of executing the next step from the server control unit of the inference server, and selects the next container for executing the next step based on the scheduling hint and the list of containers.

7. The system of claim 5, wherein the pre-trained layer and the fine-tuning layer include additional metadata, and the additional metadata:

is a data in a form of a constant list or a binary flag capable of determining whether each neural network layer is the pre-trained or fine-tuning layers, wherein the data comprises at least one of format information of an output value and an input value including a size of a matrix or a vector and a representation format of individual elements, a version of each layer set, and a unique ID, so that the pre-trained layer and the fine-tuning layer are updated and distributed independently.

8. The system of claim 5, wherein the at least one container includes an inference framework part, and the inference framework part recognizes the additional metadata, selects the pre-trained layer and the fine-tuning layer from a single model, and loads the selected pre-trained layers and fine-tuning layers into the GPU.

\* \* \* \* \*